US007243766B2

(12) United States Patent
Miwa et al.

(10) Patent No.: US 7,243,766 B2

(45) Date of Patent: Jul. 17, 2007

(54) REBOUND CUSHION FOR HYDRAULIC SHOCK ABSORBER

(75) Inventors: Masahiro Miwa, Tokyo (JP); Sachihide Makino, Nagoya (JP)

(73) Assignees: Kayaba Industry Co., Ltd., Tokyo (JP); Gomunoinaki Co., Ltd., Aichi (JP)

( * ) Notice: Subject to any disclaimer, the term of this patent is extended or adjusted under 35 U.S.C. 154(b) by 0 days.

(21) Appl. No.: 11/329,097

(22) Filed: Jan. 11, 2006

(65) Prior Publication Data

US 2006/0175165 A1 Aug. 10, 2006

(30) Foreign Application Priority Data

Jan. 18, 2005 (JP) ............................ 2005-010015

(51) Int. Cl.
*F16F 9/34* (2006.01)

(52) U.S. Cl. ...................................... 188/315; 267/220

(58) Field of Classification Search ................ 188/315, 188/322.15–322.22; 267/220

See application file for complete search history.

(56) References Cited

U.S. PATENT DOCUMENTS 5,353,689 A * 10/1994 Bolt et al. .................. 92/85 R
5,570,763 A * 11/1996 Parejo ..................... 188/282.8
5,667,041 A * 9/1997 Jensen ........................ 188/284
2002/0053495 A1* 5/2002 Kachi et al. ........... 188/322.17

FOREIGN PATENT DOCUMENTS

| | | |
|---|---|---|
| DE | 7802898 | 8/1978 |
| EP | 1624221 | 2/2006 |
| JP | 09-014328 | 1/1997 |
| JP | 2002-039252 | 2/2002 |
| JP | 2004-316726 | 11/2004 |

* cited by examiner

*Primary Examiner*—Christopher P. Schwartz
(74) *Attorney, Agent, or Firm*—Rabin & Berdo, PC

(57) ABSTRACT

A cylindrical rebound cushion (8) is fitted to an outer circumference of a piston rod (5) inserted in a cylinder (3) of a hydraulic shock absorber (1). An upper end surface (8*a*) of the rebound cushion (8) comes Into contact with a rod guide (6) fixed to the cylinder (3) when the piston rod (5) reaches a protruding limiting position. Recesses (9) are provided in the upper end surface (8*a*) of the rebound cushion (8) at regular angular intervals in order to provide working oil between the rod guide (6) and the upper end surface (8*a*), thereby ensuring smooth rotation of the rebound cushion (8) with respect to the rod guide (6) when the piston rod (5) at the protruding limiting position and the cylinder (3) relatively rotate.

13 Claims, 2 Drawing Sheets

REBOUND CUSHION FOR HYDRAULIC SHOCK ABSORBER

FIELD OF THE INVENTION

This invention relates to a rebound cushion provided in a hydraulic shock absorber for damping an impact generated when a piston rod reaches a protruding limiting position.

BACKGROUND OF THE INVENTION

JPH09-014328A published by the Japan Patent Office in 1977 discloses a rebound cushion for damping an impact accompanying protrusion of a piston of a strut type hydraulic shock absorber to the protruding limiting position.

The rebound cushion is formed in a cylindrical shape made of low rigidity rubber such as nitrile-butadiene rubber or synthetic rubber and fitted on the outer circumference of the piston rod. The piston rod is provided with a flange for supporting the rebound cushion in a protruding direction of the piston rod.

The piston rod is inserted into a cylinder, and a rod guide is provided at an upper end of the cylinder. The piston rod penetrates the rod guide and the rebound cushion is fitted to an inserted part of the piston rod in the cylinder. An inner space of the cylinder is filled with working oil. The rod guide guides the protrusion and retreat of the piston rod and also defines the protruding limiting position of the piston rod by preventing further displacement of the rebound cushion when in contact with the rebound cushion.

When the piston rod protrudes to the protruding limiting position, the rebound cushion collides against the rod guide and elastically deforms, thereby damping the impact caused by the collision.

SUMMARY OF THE INVENTION

When a strut type shock absorber is used in the suspension system of the front wheels of a vehicle that are generally the steered wheels, depending on the structure of the suspension system, the piston rod and the cylinder may relatively rotate when the driver of the vehicle steers the steering wheel of the vehicle. Normally, the rebound cushion and the rod guide are located distant from each other, and hence the rebound cushion rotates together with the piston rod in the relative rotation of the piston rod and the cylinder.

However, when the vehicle is lifted for maintenance, for example, the piston rod protrudes to the protruding limiting position and the rebound cushion comes into contact with the rod guide. Depending on the contact condition therebetween, the oil film between the rod guide and the rebound cushion is removed and a phenomenon known as an oil film tearing or solid-to-solid contact may occur between the contact surfaces.

If the driver operates the steering wheel in this state, a noise may be generated and/or the durability of the rebound cushion may be adversely affected due to the relative rotation of the rebound cushion and the rod guide without the oil film therebetween.

It is therefore an object of this invention to prevent an oil film on a possible sliding surface of the rebound cushion from tearing in a state where the piston rod is at the protruding limiting position.

In order to achieve the above object, this invention provides a rebound cushion fitted to an outer circumference of a piston rod that is inserted in a cylinder of a hydraulic shock absorber. The rebound cushion functions to damp an impact that is generated when the piston rod reaches a protruding limiting position and comprises a sliding surface that slides on another member when the piston rod at the protruding limiting position and the cylinder relatively rotate, and an oil pool formed in the sliding surface.

The details as well as other features and advantages of this invention are set forth in the remainder of the specification and are shown in the accompanying drawings.

DESCRIPTION OF THE PREFERRED EMBODIMENTS

Figure 1:
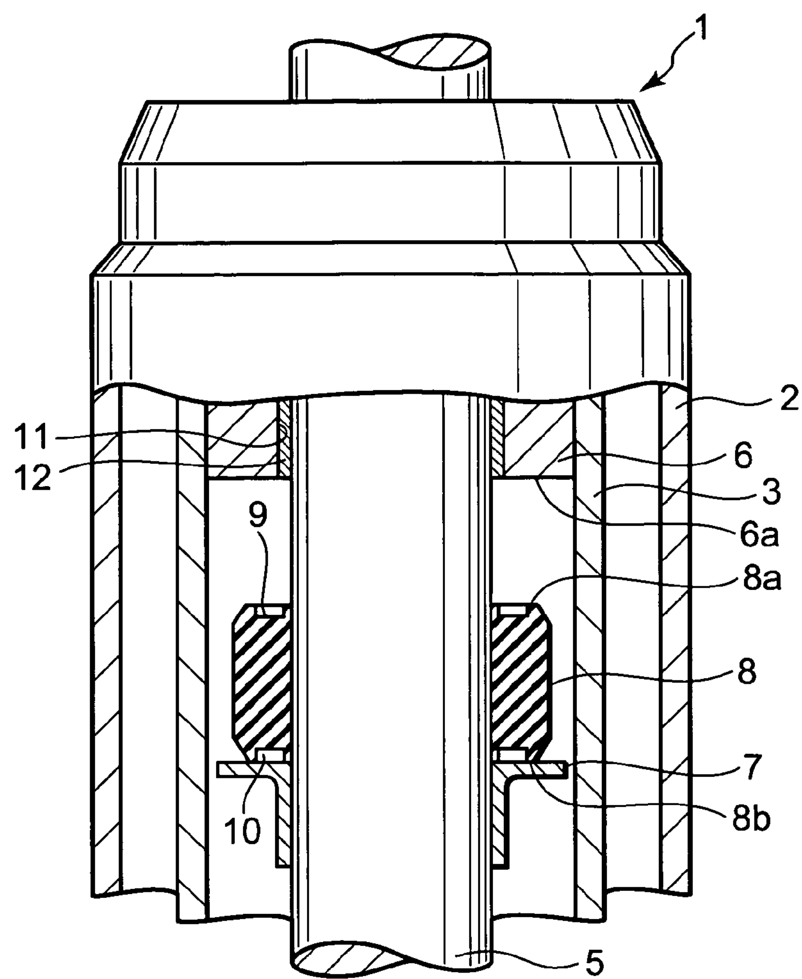
FIG. 1 is a longitudinal sectional view of essential parts of a shock absorber with a rebound cushion according to this invention.

Referring to FIG. 1 of the drawings, a double-tube strut type hydraulic shock absorber 1 used in the suspension system of a vehicle's front wheels comprises a cylinder constituted by an outer tube 2 and inner tube 3, and a piston rod 5 inserted into the inner tube 3. The hydraulic shock absorber 1 is used in a state where the piston rod 5 is connected to the vehicle body while the cylinder is connected to the front axle of the vehicle. A piston that slides along the inner circumference of the inner tube 3 is fixed to the inserted end of the piston rod 5. The outer tube 2 and the inner tube 3 are constructed to be concentric.

A rod guide 6 is fixed to an upper end of the inner tube 3 so as to guide the protruding piston rod 5 from the inner tube 3. A guide hole 11 is formed at the center of the rod guide 6 through which the piston rod 5 penetrates, and a bearing member 12 fitted in the guide hole 11 supports the piston rod 5 so as to be free to slide axially.

A cylindrical rebound cushion 8 is fitted on the outer circumference of the piston rod 5 at a position above the piston. The rebound cushion 8 is supported upwardly or in a direction of protrusion of the piston rod 5 by a flange shaped stopper 7 that is fixed, by welding for example, to the outer circumference of the piston rod 5. The rebound cushion 8 is a cylindrical member made of natural rubber, synthetic rubber or synthetic resin and is fitted to the outer circumference of the position rod 5 so as to be able to slide on the piston rod 5 in the circumferential direction.

Figure 2:
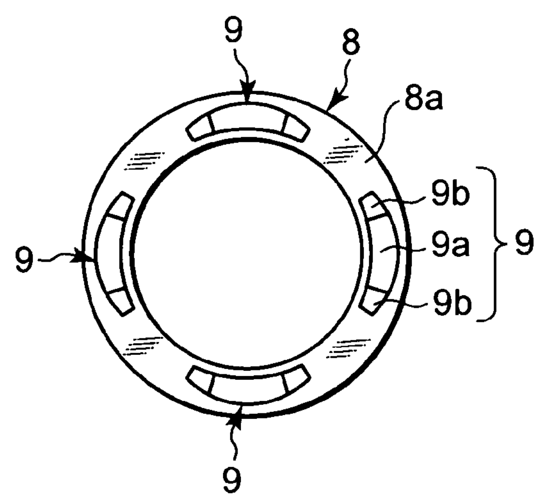
FIG. 2 is a plan view of the rebound cushion.
Figure 3:
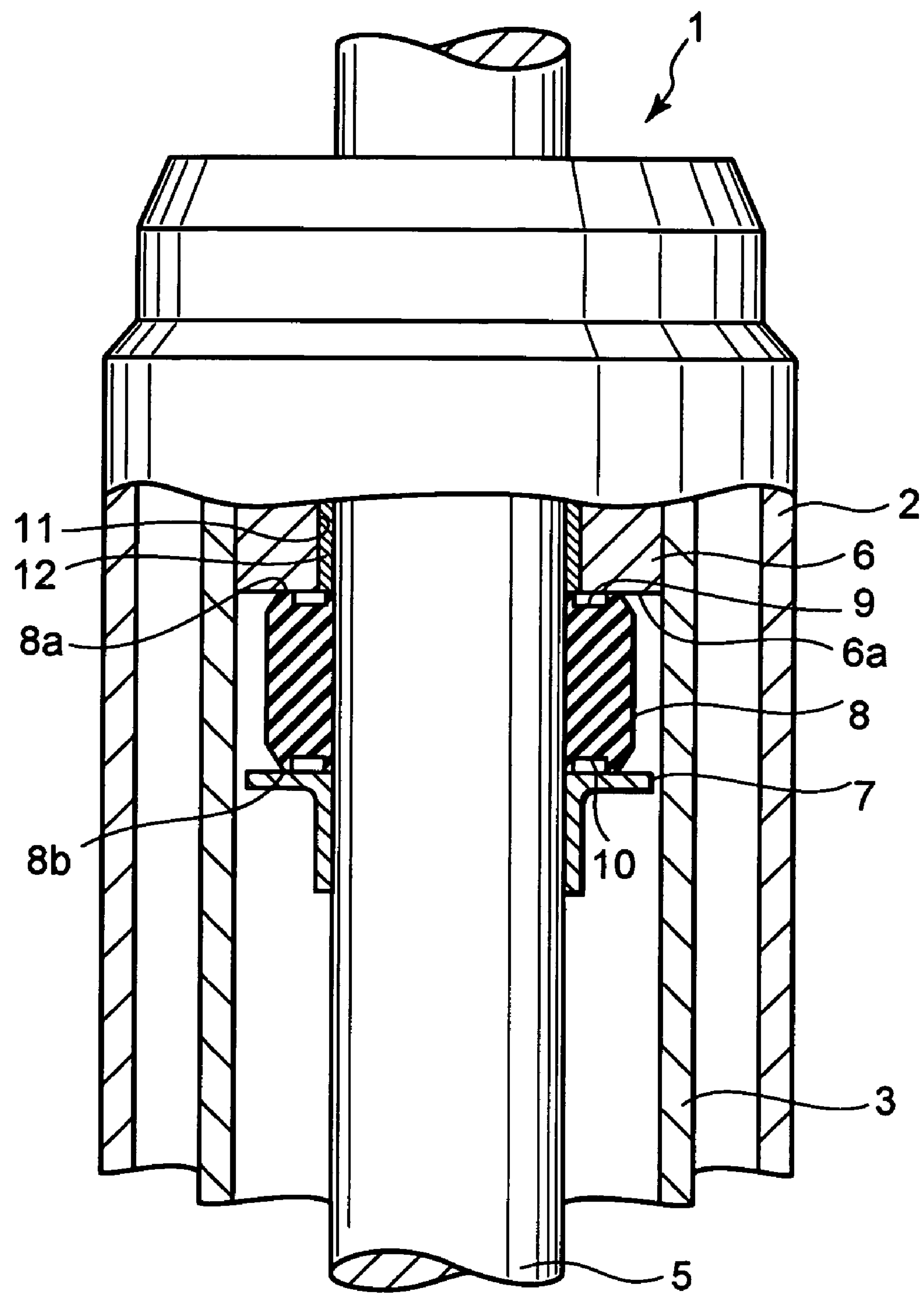
FIG. 3 is a longitudinal sectional view of essential parts of the shock absorber at a protruding limiting position.

Referring to FIG. 2, on an upper end surface **8*a* of the rebound cushion 8, four recesses 9 are formed at regular angular intervals in the circumferential direction. The recess 9 comprises a bottom 9*a* delimited by four walls. The two walls that are located on both sides of the bottom 9 in the circumferential direction are formed as a pair of inclined walls 9*b* that gradually slope outwards away from the bottom 9*a*. The inner tube 3** is filled with working oil.

According to this embodiment, recesses 10 are also formed in a lower end surface **8*b* of the rebound cushion 8. The disposition and the shape of the recesses 10 are identical to those of the recesses 9. Forming the recesses 10 in the lower end surface 8*b* of the rebound cushion 8 is preferable to prevent the oil film formed between the stopper 7 and the rebound cushion 8** from tearing.

Further, by making the disposition and the shape of the recesses 9 and 10 identical, the rebound cushion 8 can be fitted upside down to the piston rod 5 without causing any functional failure. In other words, errors that may be introduced when assembling the shock absorber can be eliminated by this arrangement of the recesses 9 and 10. It should be noted however that the recesses 10 are optional and not an indispensable feature of this invention.

In the hydraulic shock absorber 1 as constructed as the above, when the piston rod 5 reaches the protrusion limiting position, the upper end surface 8*a* of the rebound cushion 8 collides with a lower end surface 6*a* of the rod guide 6, and the rebound cushion 8 is elastically deformed between the rod guide 6 and the stopper 7, thereby damping the impact accompanying the collision of the two surfaces.

As a result of the deformation of the rebound cushion 8, working oil in the recesses 9 flows out from the recesses 9. Herein, the inclined walls 9*b* help the working oil to flow smoothly out of the recesses 9 in the circumferential directions. As a result, an oil film is formed uniformly between the upper end surface 8*a* of the rebound cushion 8 and the lower end surface 6*a* of the rod guide 6.

If the driver of the vehicle operates the steering wheel in this state, the piston rod 5 performs a rotational displacement with respect to the cylinder or the inner tube 3 as a part of the cylinder and, accordingly, the rebound cushion 8 may also perform a rotational displacement with respect to the rod guide 6.

Even in this case, however, the oil film formed between the upper end surface 8*a* of the rebound cushion 8 and the lower end surface 6*a* of the rod guide 6 ensures smooth rotational displacement of the rebound cushion 8 with respect to the rod guide 6, and prevents these members from generating noise or from becoming worn.

In contrast to the above, there may be a case where the rebound cushion 8 rotates with respect to the stopper 7 according to the relative rotation of the piston rod 5 and the cylinder. In this case also, since the sliding surfaces between the rebound cushion 8 and the stopper 7 has been lubricated by the working oil provided from the recesses 10, the rebound cushion 8 and the stopper 7 rotate smoothly relatively to one another.

This invention can be realized by simply modifying the shape of the rebound cushion 8 and does not require alteration of the material thereof. The material for the rebound cushion 8 can therefore be determined depending on the required impact damping performance of the rebound cushion 8, which is related to the inherent function of the rebound cushion 8.

The contents of Tokugan 2005-10015, with a filing date of Jan. 18, 2005 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiment, four recesses 9 are formed in the upper end surface 8*b* of the rebound cushion 8, but the number and the shape of the recesses 9 may be varied arbitrarily. Further, it is possible to replace the recesses 9 with another form of oil pool. For example, instead of forming the recesses 9, undulations may be formed in the upper end surface 8*b* or a groove or grooves may be formed along the outer circumference of the rebound cushion 8 in the upper end surface 8*b*.

The embodiment described above is directed to a double-tube strut type hydraulic shock absorber, but this invention can be applied to a single-tube strut type hydraulic shock absorber. The shock absorber to which this invention can be applied is not limited to a shock absorber for the vehicle, but may be a shock absorber for any other use.

The embodiments of this invention in which an exclusive property or privilege is claimed are defined as follows.

What is claimed is:

1. A rebound cushion fitted to an outer circumference of a piston rod that is inserted in a cylinder of a hydraulic shock absorber, the hydraulic shock absorber comprising a rod guide fixed to the cylinder and being provided with a through hole through which the piston rod penetrates, and the rebound cushion functioning to damp an impact that is generated when the piston rod reaches a protruding limiting position, the rebound cushion comprising:

an upper end surface that slides on the guide rod when the piston rod at the protruding limiting position and the cylinder relatively rotate; and a plurality of oil pools formed in the upper end surface, each of the oil pools being configured in a form of a recess which does not have openings in an outer circumference surface and an inner circumference surface of the rebound cushion.

2. The rebound cushion as defined in claim 1, wherein the rebound cushion is supported by a stopper fixed to the outer circumference of the piston rod.

3. The rebound cushion as defined in claim 2, wherein the oil pools are also formed in the lower end surface, and the location of the oil pools in the upper end surface is identical to the location of the oil pools in the lower end surface.

4. The rebound cushion as defined in claim 1, wherein the rebound cushion further comprises a lower end surface which is in contact with the stopper.

5. The rebound cushion as defined in claim 1, wherein the recess comprises a bottom and walls surrounding the bottom, the walls including a pair of walls inclined such that the depth of the recess decreases away from the bottom.

6. The rebound cushion as defined in claim 1, wherein the upper end surface is ring-shaped and the oil pools are formed in the upper end surface at regular angular intervals in a circumferential direction.

7. The rebound cushion as defined in claim 1, wherein the rebound cushion is made of rubber or resin.

8. A rebound cushion attachable to a piston rod of a shock absorber, the rebound cushion damping an impact that is generated when the piston rod reaches a protruding limiting position, the rebound cushion comprising:

an upper end surface that has a plurality of discrete, and separate recesses formed therein, each of the recesses being configured to retain oil therein, so that oil contained in each respective recess remains in the respective recess, without intermingling with oil contained in the other recesses, until the rebound cushion is deformed by the impact when the piston rod reaches the protruding limiting position, and when the rebound cushion is deformed by the impact, the oil contained in each respective recess flows therefrom.

9. The rebound cushion as defined in claim 8, wherein the recesses are evenly spaced at regular angular intervals in a circumferential direction of the upper end surface, with a recess-free space separating each adjacent recess.

10. The rebound cushion as defined in claim 8, wherein each recess is defined by two longitudinal walls, and two end walls, each of the end walls sloping outwardly away from a base of the recess, so that the base of each recess has a smaller area than an upper opening of the recess.

11. The rebound cushion as defined in claim 8, wherein the rebound cushion has a lower end surface that is identical to the upper end surface.

12. The rebound cushion as defined in claim 8, wherein the upper end surface is ring-shaped.

13. The rebound cushion as defined in claim 8, wherein the rebound cushion is comprised of rubber or resin.

* * * * *